(12) United States Patent
Stewart et al.

(10) Patent No.: US 10,385,993 B2
(45) Date of Patent: Aug. 20, 2019

(54) PIPE JOINT

(71) Applicant: Meta Downhole Limited, Aberdeen (GB)

(72) Inventors: Kevin Stewart, Aberdeen (GB); Peter Wood, Aberdeen (GB); Daniel O'Brien, Stonehaven (GB)

(73) Assignee: MORPHPACKERS LIMITED, Aberdeen (GB)

( * ) Notice: Subject to any disclaimer, the term of this patent is extended or adjusted under 35 U.S.C. 154(b) by 771 days.

(21) Appl. No.: 14/785,748

(22) PCT Filed: Apr. 22, 2014

(86) PCT No.: PCT/GB2014/051234
§ 371 (c)(1),
(2) Date: Oct. 20, 2015

(87) PCT Pub. No.: WO2014/174265
PCT Pub. Date: Oct. 30, 2014

(65) Prior Publication Data
US 2016/0084410 A1    Mar. 24, 2016

(30) Foreign Application Priority Data
Apr. 24, 2013  (GB) .................................. 1307361.4

(51) Int. Cl.
*F16L 13/14*          (2006.01)
(52) U.S. Cl.
CPC ........... *F16L 13/147* (2013.01); *F16L 13/141* (2013.01); *F16L 13/142* (2013.01); *F16L 13/143* (2013.01)

(58) Field of Classification Search
CPC ...... F16L 13/147; F16L 13/143; F16L 13/141; F16L 13/142
See application file for complete search history.

(56) References Cited

U.S. PATENT DOCUMENTS 3,498,648 A    3/1970 Hallesy
3,889,354 A    6/1975 Nishi et al.
(Continued)

FOREIGN PATENT DOCUMENTS

DE    4329442 A1    3/1995
DE    10256562 A1    4/2005
(Continued)

OTHER PUBLICATIONS

Intellectual Property Office (GB) Search report for GB1307361.4, dated Jul. 1, 2013, entire document.
(Continued)

*Primary Examiner* — James M Hewitt, II
(74) *Attorney, Agent, or Firm* — Law Office of Jesse D. Lambert, LLC

(57) ABSTRACT

A method and apparatus for creating a joint between tubulars such as tubing, pipes, casing and liner for location in a well bore. A connector (16) in the form of a sleeve is located over the ends of each tubular (12, 14) and the ends of the tubulars are morphed onto the sleeve to provide a metal to metal seal. In an embodiment the sleeve (16) is morphed onto the ends of the tubulars (12, 14). The connector may also have a profiled inner surface with circumferential grooves (266) and a sectioned locating groove (90) to provide axial and torsional load bearing capacity.

6 Claims, 2 Drawing Sheets

(56) References Cited

U.S. PATENT DOCUMENTS

| | | | |
|---|---|---|---|
| 4,371,199 A | | 2/1983 | Kushner et al. |
| 4,392,294 A | * | 7/1983 | Campbell ............... B23P 11/02 |
| | | | 29/451 |
| 4,593,448 A | * | 6/1986 | Ferrari Aggradi ..... B21D 39/04 |
| | | | 138/147 |
| 4,768,275 A | * | 9/1988 | Schmitz ................. B21D 39/04 |
| | | | 285/382 |
| 5,890,287 A | * | 4/1999 | Fukaya ................. B21D 17/025 |
| | | | 285/382 |
| 6,059,338 A | | 5/2000 | Diederichs |

FOREIGN PATENT DOCUMENTS

| | | |
|---|---|---|
| GB | 2398312 A | 8/2004 |
| KR | 100961619 B | 6/2010 |
| WO | WO 91/14894 | 10/1991 |

OTHER PUBLICATIONS

EPO as International Search Authority, International Search Report for PCT/GB2014/051234, dated Jul. 21, 2014, entire document.

* cited by examiner

PIPE JOINT

The present invention relates to a method and apparatus for creating a joint between tubulars such as tubing, pipes, casing and liner for location in a well bore. In particular, though not exclusively, the invention relates to morphing a sleeve onto each of the tubulars to be connected to form a metal to metal sealed connection.

In the exploration and production of oil and gas wells, tubulars in the form of tubing, pipe, casing and liner are run into the well bore. As the depth of each well bore can be hundreds of meters, the tubulars are manufactured in fixed lengths and then they require to be joined together. A typical method of joining tubulars together is to use a screw threaded connection to form a tubular string for insertion in a well bore. In order to achieve this type of connection each tubular member is manufactured with a box section at a first end and a pin section at the opposing end having respective male and female screw threads. The outer surface at the ends of the tubulars are keyed to allow one tubular to be held in place while the second tubular is turned so as to mate with first and make-up the threaded connection. A known disadvantage of such a connection is that if the tubular string becomes stuck in the well bore, the string cannot be rotated counter to the direction of the screw thread as the connection may come apart. Additionally standard screw threaded connections may not provide a reliable seal between the inside of the tubulars and the outside of the tubulars at the connection.

It is therefore an object of at least one embodiment of the present invention to provide a method for joining tubular members which mitigates at least some of the disadvantages of the prior art.

According to a first aspect of the present invention there is provided a method of joining first and second tubular members comprising the steps of:
  (a) providing a tubular connector;
  (b) locating a first end of the tubular connector over a first end of the first tubular member;
  (c) using hydraulic force to create a metal to metal seal between the tubular connector and the first tubular member; inserting a first end of the second tubular member into a second end of the tubular connector; and
  (d) using hydraulic force to create a metal to metal seal between the tubular connector and the second tubular member.

In this way, a joint is provided between the first and second tubular members which does not have the disadvantages of the threaded connection, provides a seal between the inside of the tubular members and the outside of the tubular members at the connection, and does not require any machining at the ends of the tubular members to 'make-up' the connection.

The force applied is a hydraulic force. In this way, the force can be uniformly distributed across a section of the connector or the tubular members.

Preferably the method includes the steps of applying the force to an inner surface of the tubular members to cause them to expand and contact an inner surface of the connector. Alternatively, the method may include the steps of applying the force to the outer surface of the connector to cause it to move radially inwards and contact the outer surfaces of the tubular members. In this way, an interference is created between the connector and each tubular member.

Preferably the method includes the step of creating the metal to metal seal at a circumferential groove on the connector. In this way, axial load strength is generated at the groove.

Preferably the method includes the step of creating a metal to metal seal; at a locating groove on the connector, wherein the locating groove does not extend circumferentially around the connector. In this way, rotational (torque) resistance is generated to prevent the tubular members rotating with respect to each other and the connector.

Preferably, the method includes the step of morphing each tubular member to the connector. In this way, a metal to metal seal is created with high pressure and load integrity.

Preferably, the hydraulic force is created by pumping of a hydraulic fluid. In this way, the creation of the metal to metal seal can be controlled.

According to a second aspect of the present invention there is provided a connector for joining first and second tubular members, comprising a substantially cylindrical body with a bore therethrough for location over a first end of the first tubular and a first end of the second tubular, the body having an outer surface with a substantial uniform diameter and a profiled inner surface wherein a plurality of circumferential grooves extend entirely around the inner surface, at least one circumferential groove being located towards each end of the connector and at least one locating groove is located towards an end of the connector, the at least one locating groove extending over a distance less than the circumference of the inner surface of the connector.

In this way, when a metal to metal seal is created between a tubular member and the connector, vertical loading is improved across the joint by the circumferential groove and the tubular is prevented from rotating relative to the connector by the seal created in the locating groove.

Preferably, the inner surface includes a ledge protruding into the bore. In this way, the tubular members are located in a fixed position in the connector by abutting the ledge.

Preferably, the bore has a diameter greater than or equal to a bore diameter of the tubular members. In this way, the connector does not obstruct the throughbore between the tubular members at the joint.

Further features are embodied in the description.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the accompanying drawings of which:

Figure 1:
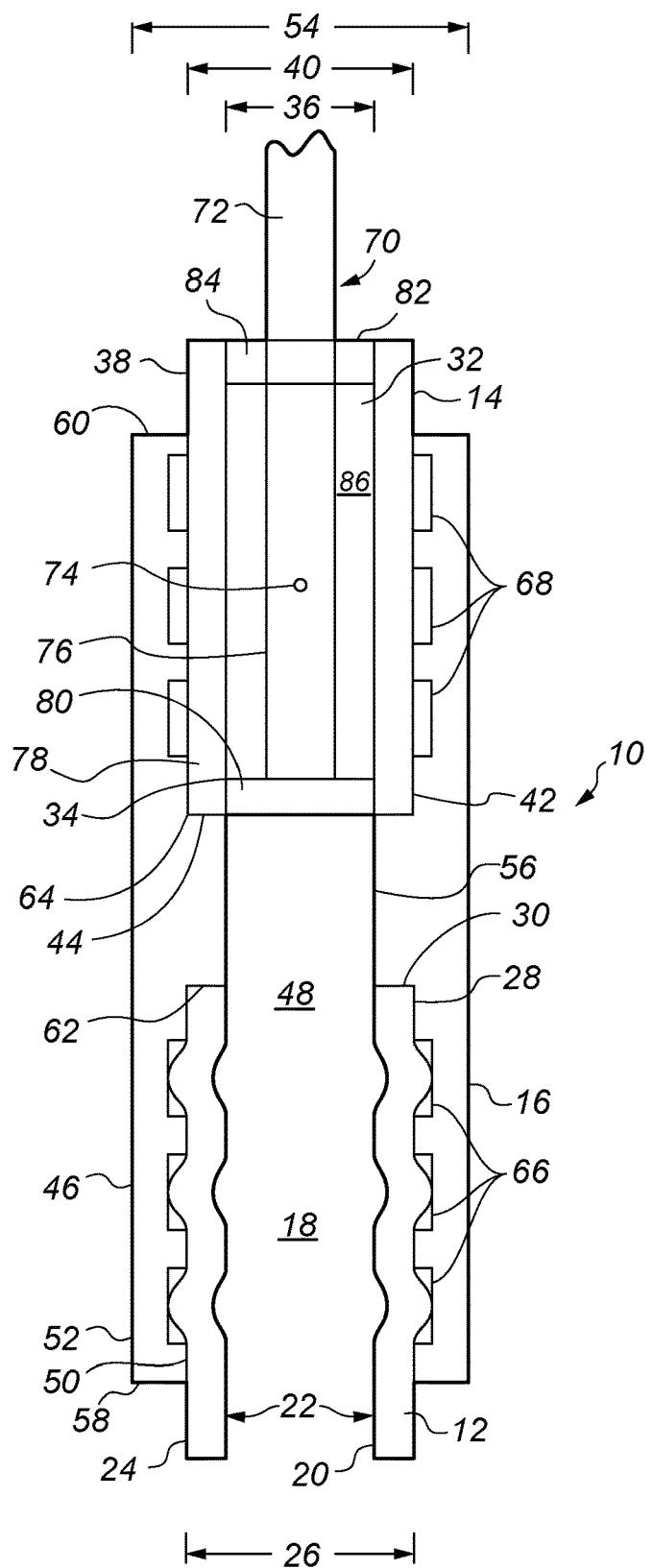
FIG. 1 is a schematic illustration of a joint between two tubular members according to a first embodiment of the present invention.

Referring initially to FIG. 1 there is provided a joint, generally indicated by reference numeral 10, providing a connection between a first tubular member 12 and a second tubular member 14 using a tubular connector 16.

The first tubular member 12 has a substantially cylindrical body having a bore 18 therethough providing an inner surface 20 with a first diameter 22 and an outer surface 24 with a second diameter 26. The first tubular member 12 is of metal construction and has dimensions typical of tubulars found in the oil and gas industry as used in tubing strings, casings and liners. The first tubular member 12 has a first end 28 with an annular end face 30 which is substantially perpendicular to the longitudinal axis of the bore 18.

The second tubular member 14 has a substantially cylindrical body having a bore 32 therethough providing an inner surface 34 with a first diameter 36 and an outer surface 38 with a second diameter 40. The second tubular member 14 is of metal construction and has dimensions typical of tubulars found in the oil and gas industry as used in tubing strings, casings and liners. The second tubular member 14 has a first end 42 with an annular end face 44 which is substantially perpendicular to the longitudinal axis of the bore 32.

It will be appreciated by those skilled in the art that each end 28,42 of the tubular members 12,14 has no special machining providing a clean cylindrical body. The tubular members 12, 14 are therefore cheaper and easier to manufacture than present tubulars used in the oil and gas industry.

The tubular connector 16 is a metal sleeve having a substantially cylindrical body 46 with a bore 48 therethough providing an inner surface 50 and an outer surface 52. The inner surface 50 is profiled while the outer surface 52 has a uniform diameter 54. The inner surface 50 includes a ledge 56 which protrudes into the bore 48 between a first end 58 and a second end 60 of the connector 16. Ledge 56 extends circumferentially around the inner surface 50 providing oppositely directed first 62 and second 64 annular surfaces. In a preferred embodiment, the dimensions of the first 62 and second 64 annular surfaces matches the dimensions of the end faces 30,44 of the first and second tubular members 12,14 respectively. In this way, the annular surfaces 62,64 can be considered as abutting faces for assisting in positioning the first and second tubular members 12,14 within the connector 16.

Towards the first end 58 on the inner surface 50 of the connector 16, there are arranged circumferential grooves 66. While three grooves 66 are shown in FIG. 1, there may be any number of grooves 66. Similarly, towards the second end 60 on the inner surface 50 of the connector 16, there are arranged circumferential grooves 68. Again, while three grooves 68 are shown in FIG. 1, there may be any number of grooves 68.

A metal to metal seal is created between the connector 16 and the first end 28 of the first tubular member 12 and also the first end 42 of the second tubular member 14. The seals are created by use of a hydraulic tool generally indicated by reference numeral 70. A detailed description of the operation of such a hydraulic tool 70 is described in GB2398312 in relation to the packer tool 112 shown in FIG. 27 with suitable modifications thereto, where the seal means 92 could be provided by suitably modified seal assemblies 214, 215 of GB2398312, the disclosure of which is incorporated herein by reference. The entire disclosure of GB2398312 is incorporated herein by reference.

The principle features of the tool 70 are described here and illustrated schematically in FIG. 1. Tool 70 has a cylindrical body 72 for locating coaxially within the bore 48 of the connector 16. Body 72 includes a port 74 through which hydraulic fluid can flow from the inside of the body 72 to the outer surface 76 of the body 72. At a first end 78 there is arranged a seal 80. Seal 80 can be selectively energised to plug the bore 48 and provide a seal between the outer surface 76 and the inner surface 20,50 of a tubular member 12,14. At an opposing end 82 there is arranged a seal 84. Seal 84 is typically of the same design as seal 80 and can also be selectively energised to provide a seal between the outer surface 76 and the inner surface 20,50 of a tubular member 12,14. The distance between the seals 80,84 is selected to ensure that the seals straddle a set of grooves 66,68 on one tubular member 12,14. Those skilled in the art will recognise the seals 80,84 as being packers as are known in the art.

In use, the first end 28 of the first tubular member 12 is inserted in the first end 58 of the connector 16, much in the way of locating a sleeve over the end 28 of the tubular member 12. Once the connector 16 is located on the end 28, the end face 30 will abut the annular surface 62. There will be a small clearance between the inner surface 50 of the connector 16 and the outer surface 24 of the member 12. The outer surface 24 of the member 12 will lie across the grooves 68. The grooves 68 may be filled with a compliant material being a sealant, foam or gel which may be compressed when the tubular member 12 bends into the groove 68 as will be described hereinafter.

The tool 70 may now be inserted into the connector 16 and located within the bore 18 of the first tubular member 12. The seals 80,84 are arranged to straddle the grooves 68 and lie over the inner surface 20 of the tubular member 12. Though the tool 70 can be inserted into the connector 16 at either end 58,60 it will be more convenient to insert the tool 70 through the second end 60, thus providing a shorter distance of travel. When in position the seals 80,84 are energised so that they expand radially outwardly and create a seal between the outer surface 76 of the tool body 72 and the inner surface 20 of the first tubular member 12.

With the seals 80,84 energised a chamber 86 is created which is bounded by the outer surface 76, the inner surface 20 and the seals 80,84. Hydraulic fluid is then pumped through the tool body 72 so that it exits the port 74 and enters the chamber 86. Once the chamber 86 is filled, continued pumping forces the end 28 of the tubular member 12 to move radially outwardly by the use of fluid pressure acting directly on the inner surface 20 between the seals 80,84. Sufficient hydraulic fluid pressure is applied to move the end 28 of the tubular member 12 radially outwards and cause the tubular member 12 to morph itself onto the inner surface 50 of the connector 16. This arrangement is illustrated in FIG. 1.

During the morphing process, the tubular member 12 will undergo elastic expansion filling or at least partially filling the grooves 66. Continued expansion will cause the tubular member 12 to undergo plastic deformation and the end 58 of the connector 16 to undergo elastic deformation to expand by a small percentage as contact is made. Pumping of hydraulic fluid is then stopped. As the pressure is released the end 58 of the connector 16 returns to its original dimensions and creates a seal against the deformed end 28 of the tubular member 12. During the morphing process, both the inner 20 and outer 24 surfaces of the end 28 of the tubular member 12 will take up the shape of the inner surface 50 of the end 58 of the connector 16. The material within the grooves 68 can improve the seal by compressing between the joint during morphing thereby preventing air pockets remaining at the grooves 66. A metal to metal seal is preferentially achieved between the connector 16 and the first tubular member 12 at the edges of the grooves 66 as the tubular member 12 bends around when it is morphed into the grooves 66. At each groove 66 there are two points for a seal, so for several grooves there are multiple sealing points. The grooves 66 provide for vertical loading when the tubular member 12 is arranged for insertion in the well bore.

With the joint between the connector 16 and the first tubular member 12 made, the seals 80,84 on the tool 70 are de-energised so that they come away from the surface 20. The tool 70 can then be removed from the connector 16 and the tubular member 12.

The first end 42 of the second tubular member 14 is then inserted into the second end 60 of the connector 16 until the end face 44 meets the second annular surface 64 of the ledge 56. The tool 70 is located into the first end 42 of the second tubular member 14 and arranged to straddle the grooves 68. The first end 42 of the second tubular member 14 is then morphed onto the second end 60 of the connector 16 as described hereinbefore with reference to the first tubular member 12. Tool 70 is removed and a metal to metal sealed joint 10 is provided between tubular member 12,14.

Following the morphing process the outer diameter 54 of the connector 16 will be substantial unchanged so that the connector 16 provides minimal increase in tubing diameter at the joint 10. This is beneficial for jointed tubing strings being run in well bores. Additionally, the inner bore 48 of the connector 16 provides the minimum bore diameter of the joint 10. Therefore by selecting the dimensions of the annular surfaces 62,64 on the ledge 56 to provide a bore 48 which matches or is greater than the bore 18,32 diameter 36 of the tubular members 12,14 the through bore at the connector 16 is not compromised by the use of the connector 16.

Figure 2:
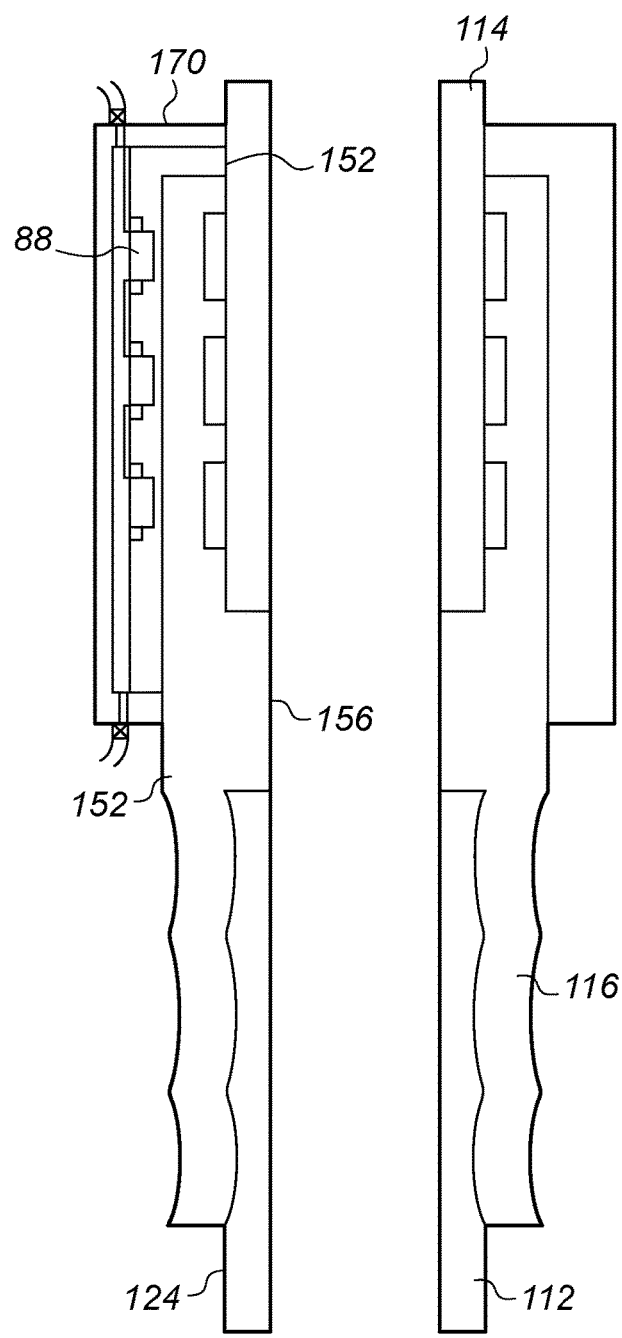
FIG. 2 is a schematic illustration of a joint between two tubular members according to a second embodiment of the present invention.

Reference is now made to FIG. 2 of the drawings which illustrates a joint, generally indicated by reference numeral 110, providing a connection between a first tubular member 112 and a second tubular member 114 using a tubular connector 116 according to a further embodiment of the present invention. Like parts to those of FIG. 1 of the drawings have been given the same reference numeral with the addition of 100 to aid clarity.

The difference between the joint 10 of the first embodiment and the joint 110 of the second embodiment is in the hydraulic metal to metal sealing tool 170 used to create the metal to metal seal between the ends 158,160 of the connector 116 and the ends 128,142 of the tubular members 112,114. Tool 170 is located around the outer surface 152 of the connector 116 at each of the ends 158,160. Hydraulic fluid is pumped into the tool 170 to cause pistons 88 to move radially inwardly. The pistons 88 are ideally arranged to provide a force equally against an entire circumference of the outer surface 152 of the connector 116. The force of the pistons 88 against the outer surface 152 of the connector 116 causes the connector 116 to also move radially inwards at the location of the pistons 88. The pistons 88 are positioned relative to the grooves 166 to cause the connector 116 to preferentially collapse and contract around the outer surface 124, 152 of the tubular 112,114. The connector 116 is therefore pressed into the outer surface 124, 152 of the tubular 112,114 creating a metal to metal seal between the connector 116 and the tubular member 112,114. Those skilled in the art will recognise that other hydraulically operated tools could be used which force the connector 116 into the tubular 112,114 to achieve a metal to metal seal. Preferably the tool 170 will provide equal pressure around the connector 116 such as may be found with a rotational crimping tool or swage device.

It will be appreciated that the grooves could be omitted or replaced with alternative sealing profiles which encourage sealing when they are forced inwards towards the outer surface 124,152 of the tubular members 112,114.

Figure 3:
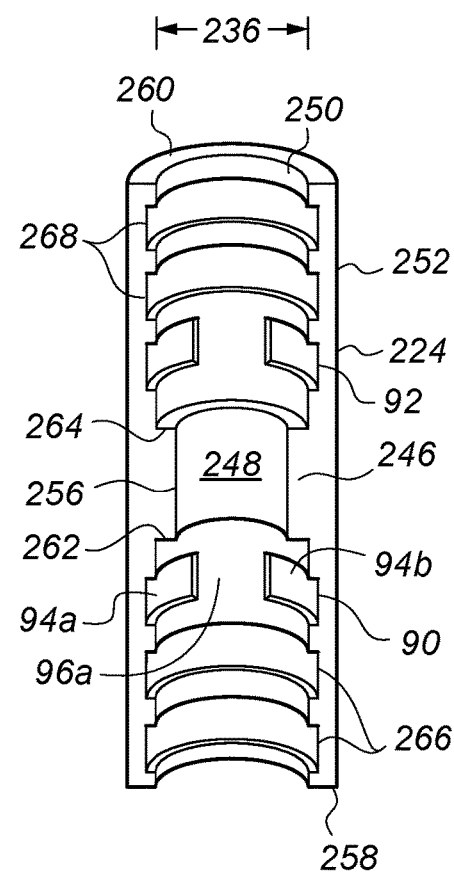
FIG. 3 is a schematic illustration of a connector for use in joining tubulars according to an embodiment of the present invention.

Reference is now made to FIG. 3 of the drawings which illustrates a connector, generally indicated by reference numeral 216, for providing a joint between two tubular members according to a further embodiment of the present invention. Like parts to those of FIG. 1 of the drawings have been given the same reference numeral with the addition of 200 to aid clarity.

Connector 216 is the same as connector 16,116 except in that there are only two circumferential grooves 266,268 located at the ends 258,260 and the third groove has been replaced by a sectioned groove 90,92. Sectioned groove 90,92 does not extend circumferentially around the inner surface 250, but is interrupted to provide three sections 94a-c between which are portions 96a-c where the inner surface 250 returns to its original diameter 236. Portions 96a-c can be considered as spindles formed in a circumferential groove.

In use, connector 216 provides a joint between two tubular members as described hereinbefore with reference to FIGS. 1 and 2. Once the joint is formed, the circumferential grooves 266,268 provide a seal entirely around each tubular member to prevent fluid from passing between the inner bore 248 and the outer surface 252 of the connector. The circumferential grooves 266,268 also spread the vertical loading radially around the connector when the joint is used on a tubular string being inserted into a well bore. The sectioned grooves 90,92 prevent the tubular members rotating relative to the connector 216. It will be understood that any pattern of sectioned grooves which do not provide an entirely circumferential groove around the inner surface 250 can be used. Indeed a single sectioned groove could be used.

The principle advantage of the present invention is that it provides a method of connecting two tubular members which provides a metal to metal seal between the members and a connector at the joint.

A further advantage of the present invention is that it provides a method of connecting two tubular members which does not require the members to have any special fittings or machined sections at their ends.

A yet further advantage of at least one embodiment of the present invention is that it provides connector for use in a joint between tubular members which prevents relative rotation of the tubular members when joined together.

It will be appreciated by those skilled in the art that modifications may be made to the invention herein described without departing from the scope thereof. For example, while the tubular members have been described as metal structures, only the end portions need to have metal to form the seal and thus the tubular members may be of composite form with metal ends. Additionally the hydraulic metal to metal sealing tool may extend over the entire length of the conductor and provide a dual expansion capability so that seals can be created between the connector and both the tubular members at the same time.

We claim:

1. A method of joining first and second tubular members, comprising the steps of:
    a. providing a tubular connector, the tubular connector having a cylindrical body, the body having with an outer surface with a uniform diameter and a profiled inner surface wherein a plurality of circumferential grooves extend entirely around the inner surface, at least one circumferential groove being located towards each end of the tubular connector;
    b. locating a first end of the tubular connector over a first end of the first tubular member;
    c. using a hydraulic tool to provide a hydraulic force to move the tubular connector and the first end radially with respect to each other and create a metal to metal seal between the tubular connector and the first tubular member;
    d. inserting a first end of the second tubular member into a second end of the tubular connector; and
    e. using a hydraulic tool to provide a hydraulic force to move the tubular connector and the second end radially with respect to each other and create a metal to metal seal between the tubular connector and the second tubular member, wherein said tubular connector and said first and second tubular members are steel, and wherein said hydraulic forces are applied to the outer surface of the connector to cause it to move radially inwards and contact the outer surfaces of the first and second tubular members, and wherein the method includes the step of creating a metal to metal seal at a locating groove on the connector, the locating groove positioned on said inner surface of said cylindrical body between said circumferential grooves and an inner shoulder within said cylindrical body, and wherein the locating groove does not extend circumferentially around the connector.

2. A method of joining first and second tubular members according to claim 1 wherein the method includes the step of creating the metal to metal seal at a circumferential groove on the connector.

3. A method of joining first and second tubular members according to claim 1 wherein the method includes the step of morphing each tubular member to the connector.

4. A method of joining first and second tubular members according to claim 1 wherein the hydraulic force is created by pumping of a hydraulic fluid.

5. A connector for joining first and second tubular members, comprising a substantially cylindrical body with a bore therethrough for location over a first end of the first tubular and a first end of the second tubular, the body having an outer surface with a uniform diameter and a profiled inner surface wherein a plurality of circumferential grooves extend entirely around the inner surface, at least one circumferential groove being located towards each end of the connector and at least one circumferential groove located towards an end of the connector is a locating groove which extends circumferentially over a distance less than the full circumference of the inner surface of the connector, wherein said connector and said first and second tubular members are steel, and whereby when hydraulic forces are applied to an outer surface of the connector, said hydraulic forces cause said connector to move radially inwards and contact the outer surfaces of the first and second tubular members, wherein the inner surface includes a ledge protruding into the bore, and wherein said locating groove is positioned between said ledge and said circumferential grooves extending entirely around the inner surface.

6. A connector according to claim 5 wherein the bore has a diameter greater than or equal to a bore diameter of the tubular members.

* * * * *